US011025349B1

United States Patent
Ahn et al.

(10) Patent No.: US 11,025,349 B1
(45) Date of Patent: Jun. 1, 2021

(54) METHOD FOR DECODING CHANNEL USING NOISE LEVEL CORRECTION IN HIGH-SPEED MOBILE RECEPTION ENVIRONMENT AND APPARATUS USING THE SAME

(71) Applicant: ELECTRONICS AND TELECOMMUNICATIONS RESEARCH INSTITUTE, Daejeon (KR)

(72) Inventors: Sung-Jun Ahn, Daejeon (KR); Bo-Mi Lim, Daejeon (KR); Sun-Hyoung Kwon, Daejeon (KR); Sung-Ik Park, Daejeon (KR); Jae-Young Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/863,393

(22) Filed: Apr. 30, 2020

(30) Foreign Application Priority Data

Dec. 26, 2019 (KR) .................... 10-2019-0175305

(51) Int. Cl.
  *H04B 17/336* (2015.01)
  *H04B 17/318* (2015.01)
  *H04L 1/00* (2006.01)

(52) U.S. Cl.
  CPC ......... *H04B 17/336* (2015.01); *H04B 17/318* (2015.01); *H04L 1/0054* (2013.01)

(58) Field of Classification Search
  CPC .... H04B 17/336; H04B 17/318; H04L 1/0054
  See application file for complete search history.

(56) References Cited

U.S. PATENT DOCUMENTS

| 8,593,980 | B2 | 11/2013 | Bae et al. | |
| 2003/0031234 | A1* | 2/2003 | Smee | H04B 7/0848 375/147 |
| 2006/0239367 | A1* | 10/2006 | Wilhelmsson | H04L 25/03006 375/260 |
| 2008/0043812 | A1* | 2/2008 | Moffatt | H04B 1/707 375/133 |
| 2012/0269251 | A1 | 10/2012 | Park et al. | |
| 2013/0182746 | A1 | 7/2013 | Panicker et al. | |

FOREIGN PATENT DOCUMENTS

KR 10-2011-0067769 A 6/2011

OTHER PUBLICATIONS

Ye (Geoffrey) Li and Leonard J. Cimini, "Bounds on the Interchannel interference of OFDM in Time-Varying Impairments," IEEE Transactions on Communications, vol. 49, No. 3, pp. 401-404, Mar. 2001.

* cited by examiner

*Primary Examiner* — Sung S Ahn
(74) *Attorney, Agent, or Firm* — Rabin & Berdo, P.C.

(57) ABSTRACT

Disclosed herein are a method for channel decoding using noise level correction in a high-speed mobile reception environment and an apparatus for the same. The method includes estimating, by a signal receiver that is based on OFDM and is moving at high speed, Inter-Carrier Interference (ICI) power for received signal power based on the movement speed of the signal receiver; calculating, by the signal receiver, a Signal-to-Noise Ratio (SNR) for a received signal using an estimate of the ICI power; and decoding, by the signal receiver, a channel code based on a Log Likelihood Ratio (LLR) per bit, calculated based on the SNR, and the received signal.

8 Claims, 6 Drawing Sheets

| MODULATION ORDER | LDPC CODE RATE | TRANSMISSION RATE [Mbps] | CORRECTION SNR BASED ON ICI ESTIMATION | RECEIVER SPEED | | | | | |
|---|---|---|---|---|---|---|---|---|---|
| | | | | 20 km/h | 60 km/h | 120 km/h | 200 km/h | 250 km/h | 300 km/h |
| QPSK | 9/15 | 4.94 | NO CORRECTION (CONVENTIONAL RECEIVER) | 6.90dB | 6.10dB | 6.62dB | 9.82dB | | |
| | | | NO ERROR IN ESTIMATION OF RECEIVER SPEED | 6.90dB | 6.10dB | 6.42dB | 8.52dB | 13.02dB | |
| | | | ERROR IN ESTIMATION OF RECEIVER SPEED 5% | 6.90dB | 6.11dB | 6.42dB | 8.62dB | 13.32dB | |
| | | | ERROR IN ESTIMATION OF RECEIVER SPEED 10% | 6.90dB | 6.10dB | 6.52dB | 8.62dB | 13.52dB | |
| | | | ERROR IN ESTIMATION OF RECEIVER SPEED 20% | 6.90dB | 6.11dB | 6.52dB | 8.72dB | 14.22dB | |
| 16-NUC | 4/15 | 4.29 | NO CORRECTION (CONVENTIONAL RECEIVER) | 5.30dB | 4.60dB | 4.82dB | 6.72dB | 10.72dB | |
| | | | NO ERROR IN ESTIMATION OF RECEIVER SPEED | 5.30dB | 4.50dB | 4.71dB | 6.01dB | 7.92dB | 13.62dB |

FIG. 3

METHOD FOR DECODING CHANNEL USING NOISE LEVEL CORRECTION IN HIGH-SPEED MOBILE RECEPTION ENVIRONMENT AND APPARATUS USING THE SAME

CROSS REFERENCE TO RELATED APPLICATION

This application claims the benefit of Korean Patent Application No. 10-2019-0175305, filed Dec. 26, 2019, which is hereby incorporated by reference in its entirety into this application.

BACKGROUND OF THE INVENTION

1. Technical Field

The present invention relates generally to technology for channel decoding in a high-speed mobile reception environment, and more particularly to technology for improving channel-code-decoding performance by correcting an estimate of a Signal-to-Noise Ratio (SNR) based on a movement speed measured in an OFDM communication signal reception environment that is moving at high speed.

2. Description of the Related Art

The recent broadcast systems, represented by the ATSC 3.0 terrestrial broadcast standard, are designed so as to enable not only high-capacity data transmission, having significantly improved performance compared to conventional broadcast systems, but also mobile broadcast services using a very robust transmission mode. However, when a broadcast communication system configured to transmit and receive broadcast signals based on Orthogonal Frequency-Division Multiplexing (OFDM) receives a broadcast signal in a fast-moving vehicular environment, the performance is significantly degraded by Inter-Carrier Interference (ICI) arising from a Doppler shift, so it is very difficult to receive a broadcast signal in an environment that is moving at the speed of 200 km/h or higher.

Here, degradation of signal reception performance is attributable to calculation of an SNR without consideration of the effect of ICI. When channel decoding is performed after a log-likelihood ratio (LLR) is calculated based on the SNR calculated without consideration of the effect of ICI, a problem of channel mismatch may be caused.

DOCUMENTS OF RELATED ART (Patent Document 1) Korean Patent Application Publication No. 10-2011-0067769, published on Jun. 22, 2011 and titled "Method and system for generating feedback for uplink transmission power control".

SUMMARY OF THE INVENTION

An object of the present invention is to improve the channel-code-decoding performance of an OFDM communication signal receiver for a high-speed mobile environment.

Another object of the present invention is to enable reception of a broadcast in a vehicle that is moving at high speed, which is impossible in the conventional broadcast reception system.

A further object of the present invention is to correct an estimate of a Signal-to-Noise Ratio (SNR) in an OFDM-based reception system.

In order to accomplish the above objects, a method for channel decoding using noise level correction according to the present invention includes estimating, by a signal receiver based on OFDM that is moving at high speed, Inter-Carrier Interference (ICI) power for received signal power based on the movement speed of the signal receiver; calculating, by the signal receiver, a Signal-to-Noise Ratio (SNR) for a received signal using an estimate of the ICI power; and decoding, by the signal receiver, a channel code based on a Log Likelihood Ratio (LLR) per bit, calculated based on the SNR, and the received signal.

Here, the SNR may be calculated by dividing the received signal power by a sum of noise power for the received signal and the estimate of the ICI power.

Here, the estimate of the ICI power may be estimated based on a value acquired by multiplying a symbol length by the maximum Doppler shift frequency, which is calculated depending on the movement speed.

Here, the maximum Doppler shift frequency may be calculated based on the movement speed, the center frequency of an OFDM signal, and the speed of light.

Here, the movement speed may be measured through a separate speed measurement module that is capable of communicating with the signal receiver.

Also, a signal receiver based on OFDM according to an embodiment of the present invention includes a processor for estimating Inter-Carrier Interference (ICI) power for received signal power based on the movement speed, calculating a Signal-to-Noise Ratio (SNR) for a received signal using an estimate of the ICI power, and decoding a channel code based on a Log Likelihood Ratio (LLR) per bit, calculated based on the SNR, and the received signal; and memory for storing the received signal.

Here, the SNR may be calculated by dividing the received signal power by a sum of noise power for the received signal and the estimate of the ICI power.

Here, the estimate of the ICI power may be estimated based on a value acquired by multiplying a symbol length by the maximum Doppler shift frequency calculated depending on the movement speed.

Here, the maximum Doppler shift frequency may be calculated based on the movement speed, the center frequency of an OFDM signal, and the speed of light.

Here, the movement speed may be measured through a separate speed measurement module that is capable of communicating with the signal receiver.

BRIEF DESCRIPTION OF THE DRAWINGS

The above and other objects, features and advantages of the present invention will be more clearly understood from the following detailed description, taken in conjunction with the accompanying drawings, in which:

FIG. 3 is a view illustrating an example of a Threshold-of-Visibility (ToV) performance improvement simulation with regard to OFDM signal reception in a TU-6 mobile channel environment according to the present invention;

DESCRIPTION OF THE PREFERRED EMBODIMENTS

Figure 1:
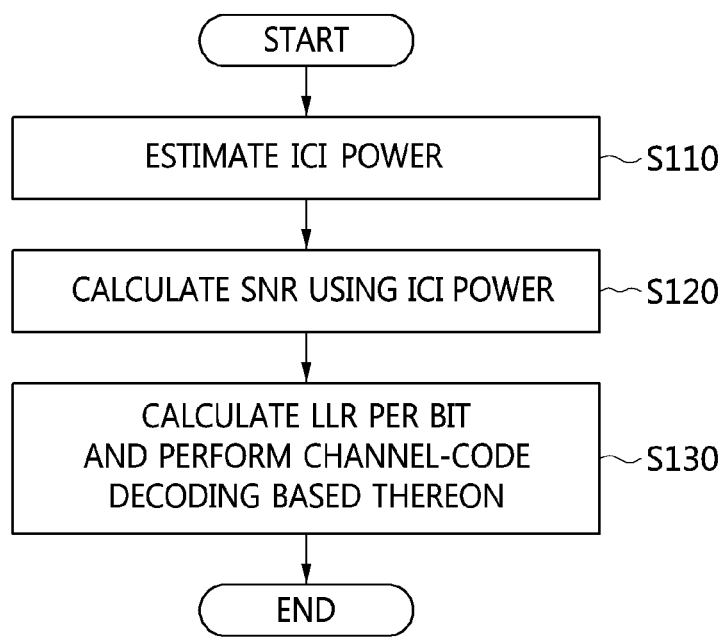
FIG. 1 is a flowchart illustrating a method for channel decoding using noise level correction according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a flowchart illustrating a method for channel decoding using noise level correction according to an embodiment of the present invention.

Referring to FIG. 1, in the method for channel decoding using noise level correction according to an embodiment of the present invention, an OFDM-based signal receiver that is moving at high speed estimates Inter-Carrier Interference (ICI) power for received signal power based on the movement speed of the signal receiver at step S110.

Here, the movement speed may be measured using a separate speed measurement module that is able to communicate with the signal receiver.

For example, the signal receiver for communication based on OFDM according to an embodiment of the present invention is connected with a speed measurement device, such as a GPS signal receiver, a vehicle speed measurement device, or the like, which is able to acquire information about a movement speed, thereby acquiring the movement speed.

Here, an estimate of the ICI power may be estimated based on a value acquired by multiplying a symbol length by the maximum Doppler shift frequency, which is calculated depending on the movement speed.

Here, the maximum Doppler shift frequency may be calculated based on the movement speed, the center frequency of the OFDM signal, and the speed of light.

For example, when the Doppler shift amount depending on the movement speed of the signal receiver is given, the estimate of the ICI power may be calculated as shown in Equation (1):

$$P_{ICI}=(2\pi f_d T_s)^2 P/24=(2\pi v f_c T_s/c)^2 P/24 \qquad (1)$$

Here, $f_d$, $T_s$, v, $f_c$, and P denote the maximum Doppler shift frequency, the symbol length, the movement speed of the receiver, the center frequency of the OFDM signal, the speed of light (=3×10$^8$ m/s), and the received signal power, respectively.

Also, in the method for channel decoding using noise level correction according to an embodiment of the present invention, the signal receiver calculates a Signal-to-Noise Ratio (SNR) for the received signal using the estimate of the ICI power at step S120.

Here, the SNR may be calculated by dividing the received signal power by the sum of the noise power and the estimate of the ICI power.

Here, in the present invention, the SNR may be corrected based on the estimate of the ICI power, made as shown in Equation (2):

$$\gamma=P/(\sigma^2+P_{ICI}')=P/(\sigma^2+P(2\pi v'f_c T_s/c)^2/24) \qquad (2)$$

Here, P, $\sigma^2$, $P_{ICI}'$, and v' may denote the received signal power, the noise power, the estimate of the ICI power, and an estimate of the movement speed, respectively.

Also, in the method for channel decoding using noise level correction according to an embodiment of the present invention, the signal receiver decodes a channel code based on a Log Likelihood Ratio (LLR) per bit, calculated based on the SNR, and the received signal at step S130.

When the SNR is corrected through the above-described process, the reception performance in a mobile channel environment may be improved. For example, FIG. 3 is the result acquired by performing a transmission simulation based on the ATSC 3.0 standard, and a dB value written for each speed value of a receiver in FIG. 3 may indicate a Threshold of Visibility (ToV), which is the minimum reception SNR that enables reception of a broadcast signal.

Referring to FIG. 3, the conventional signal receiver that does not correct the estimate of the SNR is not able to receive service of 4.94 Mbps in an environment moving at 250 km/h, but the signal receiver calibrated according to the present invention includes the minimum reception SNR 310 for receiving service of 4.94 Mbps in an environment moving at 250 km/h, whereby the service may be received. That is, it is confirmed that service that is impossible to receive using the conventional art may be received by performing SNR correction according to the present invention.

Further, in the case of a broadcast service of 4.29 Mbps, it is impossible to receive service using the conventional art, but the signal receiver calibrated according to the present invention includes the minimum reception SNR 320 for receiving service of 4.29 Mbps in an environment moving at 300 km/h, whereby it is possible to receive a signal.

Channel decoding is performed through the above-described method for channel decoding using noise level correction, whereby reception of a broadcast in a fast-moving vehicle, which is impossible in a conventional broadcast reception system, may become possible.

Also, the channel-code-decoding performance of an OFDM communication signal receiver for a high-speed mobile environment may be improved.

Figure 2:
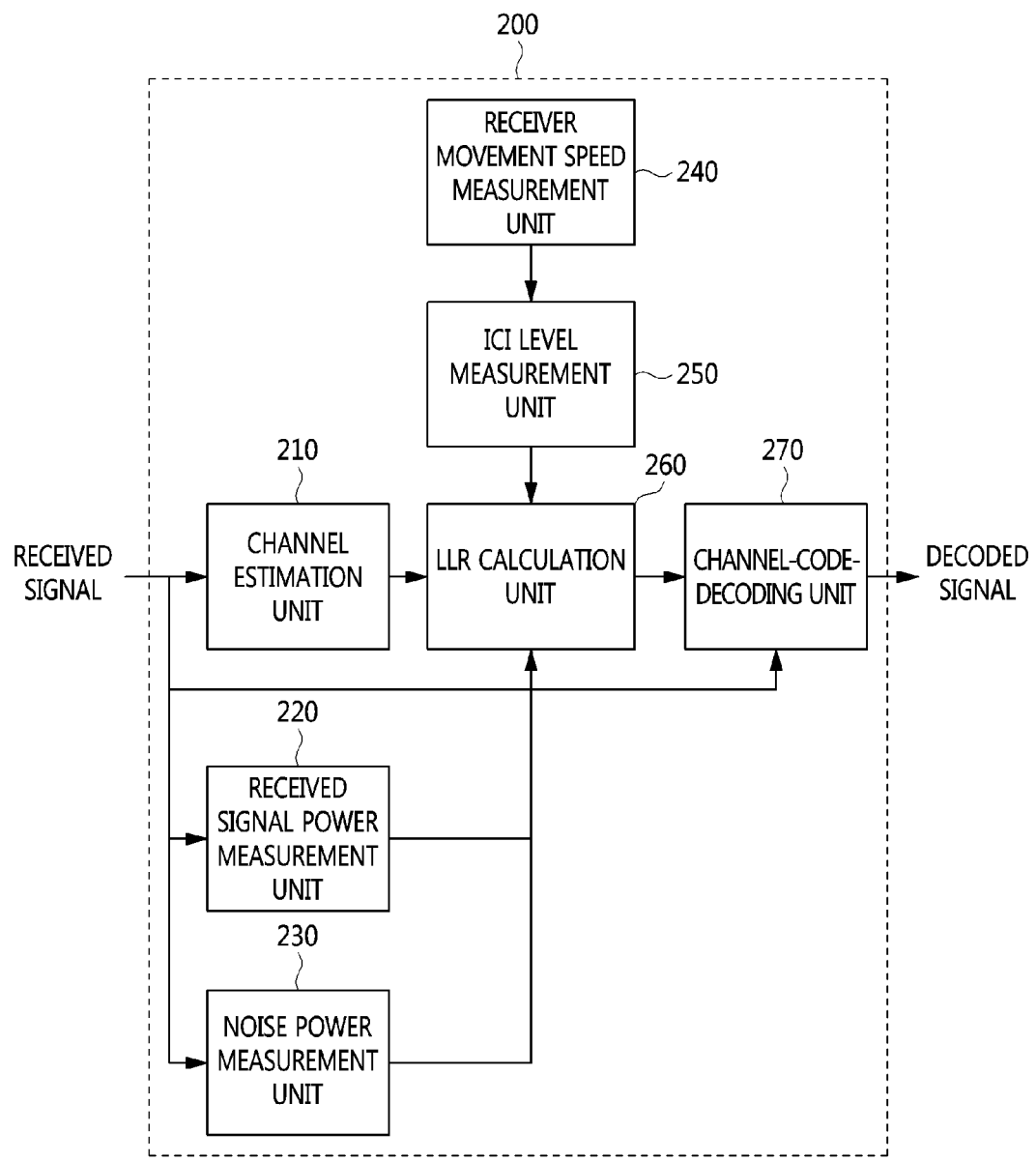
FIG. 2 is a view illustrating an example of an OFDM-based signal receiver according to the present invention.

FIG. 2 is a view illustrating an example of a signal receiver based on OFDM according to the present invention.

Referring to FIG. 2, an OFDM-based signal receiver 200 according to the present invention includes a channel estimation unit 210, a received signal power measurement unit 220, a noise power measurement unit 230, a receiver movement speed measurement unit 240, an ICI level measurement unit 250, an LLR calculation unit 260, and a channel-code-decoding unit 270.

The channel estimation unit 210 may estimate channel gain based on a pilot signal of a received signal that is input to the OFDM-based signal receiver 200, and the received signal power measurement unit 220 may measure the reception power of the received signal. Here, through the noise power measurement unit 230, the noise power may be measured using signal power measured in a band outside the occupied frequency bandwidth or using the cyclic prefix-based measurement within the occupied frequency bandwidth.

Also, the receiver movement speed measurement unit 240 may measure the movement speed of the signal receiver 200 based on the position information of the receiver, measured using a GPS signal, information obtained from a speed measurement device installed in a vehicle, or the like.

The ICI level measurement unit 250 may calculate an estimate of ICI relative to the received signal power by receiving the movement speed of the signal receiver.

The LLR calculation unit 260 may calculate the SNR of the received signal based on the channel gain, the received signal power, the noise power, and the estimate of the ICI power relative to the received signal power, which are measured by the channel estimation unit 210, the received signal power measurement unit 220, the noise power measurement unit 230, and the ICI level measurement unit 250, respectively, and may calculate an LLR per signal bit, which will be used in the channel-code-decoding unit 270, using the calculated SNR.

The channel-code-decoding unit 270 may perform channel-code decoding based on the LLR value for each bit of the received signal, which is calculated in the LLR calculation unit 260, and the received signal.

Figure 4:
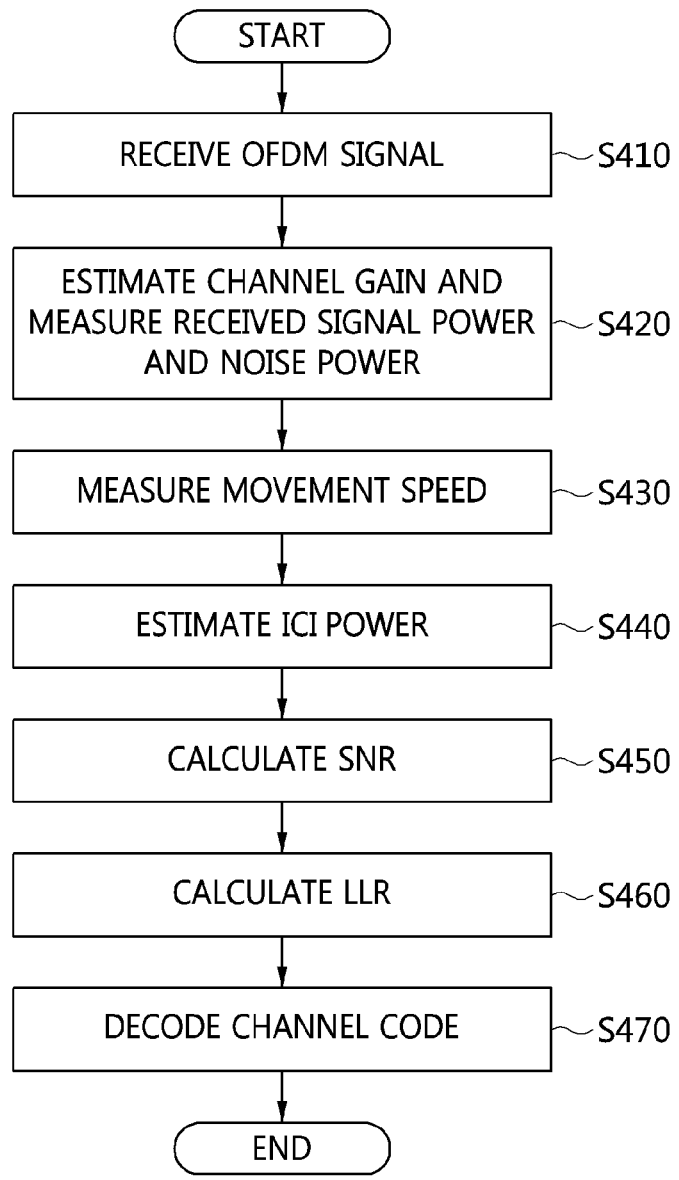
FIG. 4 is a flowchart specifically illustrating a channel-decoding process based on the structure of the signal receiver illustrated in FIG. 2.

FIG. 4 is a flowchart specifically illustrating a channel-decoding process based on the signal receiver structure illustrated in FIG. 2.

Referring to FIG. 4, when a signal receiver according to an embodiment of the present invention receives an OFDM signal in an environment moving at high speed at step S410, channel gain, received signal power, and noise power may be measured based on the channel estimation unit 210, the received signal power measurement unit 220, and the noise power measurement unit 230 at step S420.

Then, the movement speed of the signal receiver may be measured based on a movement speed measurement module, such as a GPS signal receiver or a vehicle speed measurement device, at step S430, and an estimate of ICI power relative to the received signal power may be calculated using the measured movement speed at step S440.

Then, based on the measured channel gain, the measured received signal power, the measured noise power, and the estimate of the ICI power relative to the received signal power, the SNR of the received signal may be calculated at step S450, and an LLR for each bit of the received signal, which will be used for channel-code decoding, may be calculated using the calculated SNR at step S460.

Then, channel-code decoding may be performed at step S470 based on the LLR value for each bit of the received signal, which is calculated based on the corrected SNR, and the received signal.

Figure 5:
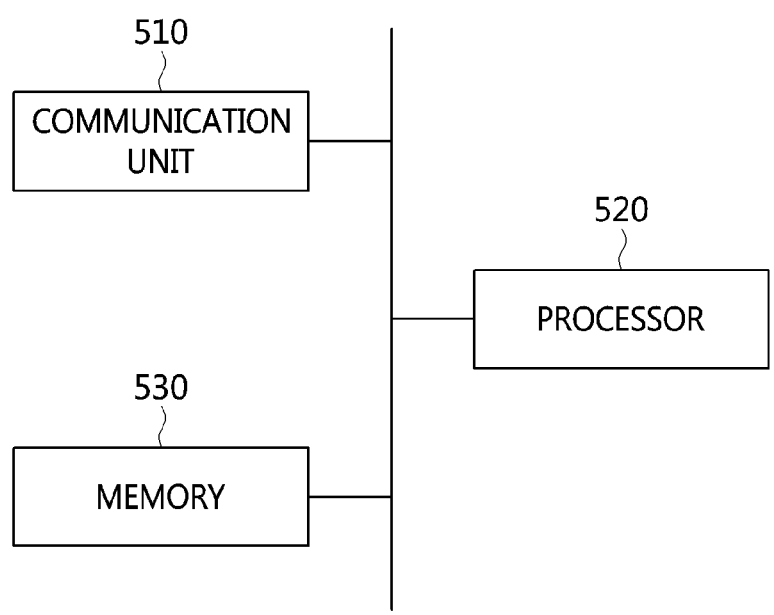
FIG. 5 is a block diagram illustrating an OFDM-based signal receiver according to another embodiment of the present invention.

FIG. 5 is a block diagram illustrating a signal receiver based on OFDM according to another embodiment of the present invention.

Referring to FIG. 5, an OFDM-based signal receiver according to another embodiment of the present invention includes a communication unit 510, a processor 520, and memory 530.

The communication unit 510 functions to receive relevant information for channel decoding through a communication network. Particularly, the communication unit 510 according to an embodiment of the present invention may receive a signal based on OFDM.

The processor 520 estimates Inter-Carrier Interference (ICI) power for received signal power based on the movement speed.

Here, the movement speed may be measured using a separate speed measurement module that is able to communicate with the signal receiver.

For example, the signal receiver for communication based on OFDM according to an embodiment of the present invention is connected with a speed measurement device, such as a GPS signal receiver, a vehicle speed measurement device, or the like, which is able to acquire information about a movement speed, thereby acquiring the movement speed.

Here, the estimate of the ICI power may be estimated based on a value acquired by multiplying a symbol length by the maximum Doppler shift frequency, which is calculated depending on the movement speed.

Here, the maximum Doppler shift frequency may be calculated based on the movement speed, the center frequency of the OFDM signal, and the speed of light.

For example, when the Doppler shift amount depending on the movement speed of the signal receiver is given, the estimate of the ICI power may be calculated as shown in Equation (1):

$$P_{ICI}=(2\pi f_d T_s)^2 P/24=(2\pi v f_c T_s/c)^2 P/24 \quad (1)$$

Here, $f_d$, $T_s$, v, c, and P denote the maximum Doppler shift frequency, the symbol length, the movement speed of the receiver, the center frequency of the OFDM signal, the speed of light (=3×10$^8$ m/s), and the received signal power respectively.

Also, the processor 520 calculates a Signal-to-Noise Ratio (SNR) for the received signal using the estimate of the ICI power.

Here, the SNR may be calculated by dividing the received signal power by the sum of the noise power and the estimate of the ICI power.

Here, in the present invention, the SNR may be corrected based on the estimate of the ICI power, as shown in Equation (2):

$$\gamma=P/(\sigma^2+P_{ICI}')=P/(\sigma^2+P(2\pi v'f_c T_s/c)^2/24) \quad (2)$$

Here, P, $\sigma^2$, $P_{ICI}'$, and v' may denote the received signal power, the noise power, the estimate of the ICI power, and an estimate of the movement speed, respectively.

Also, the processor 520 decodes a channel code based on a Log Likelihood Ratio (LLR) per bit, calculated based on the SNR, and the received signal.

When the SNR is corrected through the above-described process, the reception performance in a mobile channel environment may be improved. For example, FIG. 3 is the result acquired by performing a transmission simulation based on the ATSC 3.0 standard, and a dB value written for each speed value of a receiver in FIG. 3 may indicate a Threshold of Visibility (ToV), which is the minimum reception SNR that enables reception of a broadcast signal.

Referring to FIG. 3, the conventional signal receiver that does not correct the estimate of the SNR is not able to receive service of 4.94 Mbps in an environment moving at 250 km/h, but the signal receiver calibrated according to the present invention includes the minimum reception SNR 310 for receiving service of 4.94 Mbps in an environment moving at 250 km/h, whereby the service may be received. That is, it is confirmed that service that is impossible to receive using the conventional art may be received by performing SNR correction according to the present invention.

Further, in the case of a broadcast service of 4.29 Mbps, it is impossible to receive service using the conventional art, but the signal receiver calibrated according to the present invention includes the minimum reception SNR 320 for receiving service of 4.29 Mbps in an environment moving at 300 km/h, whereby it is possible to receive a signal.

The memory 530 stores the received signal.

Also, the memory 530 stores various kinds of information generated in the above-described channel-decoding process according to an embodiment of the present invention.

According to an embodiment, the memory 530, which is separate from the signal receiver based on OFDM, may support functions for channel decoding. Here, the memory 530 may operate as separate mass storage, and may include a control function for performing operations.

Meanwhile, the signal receiver based on OFDM includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage.

Using the above-described OFDM-based signal receiver, reception of a broadcast in a fast-moving vehicle, which is impossible using a conventional broadcast reception system, may become possible.

Figure 6:
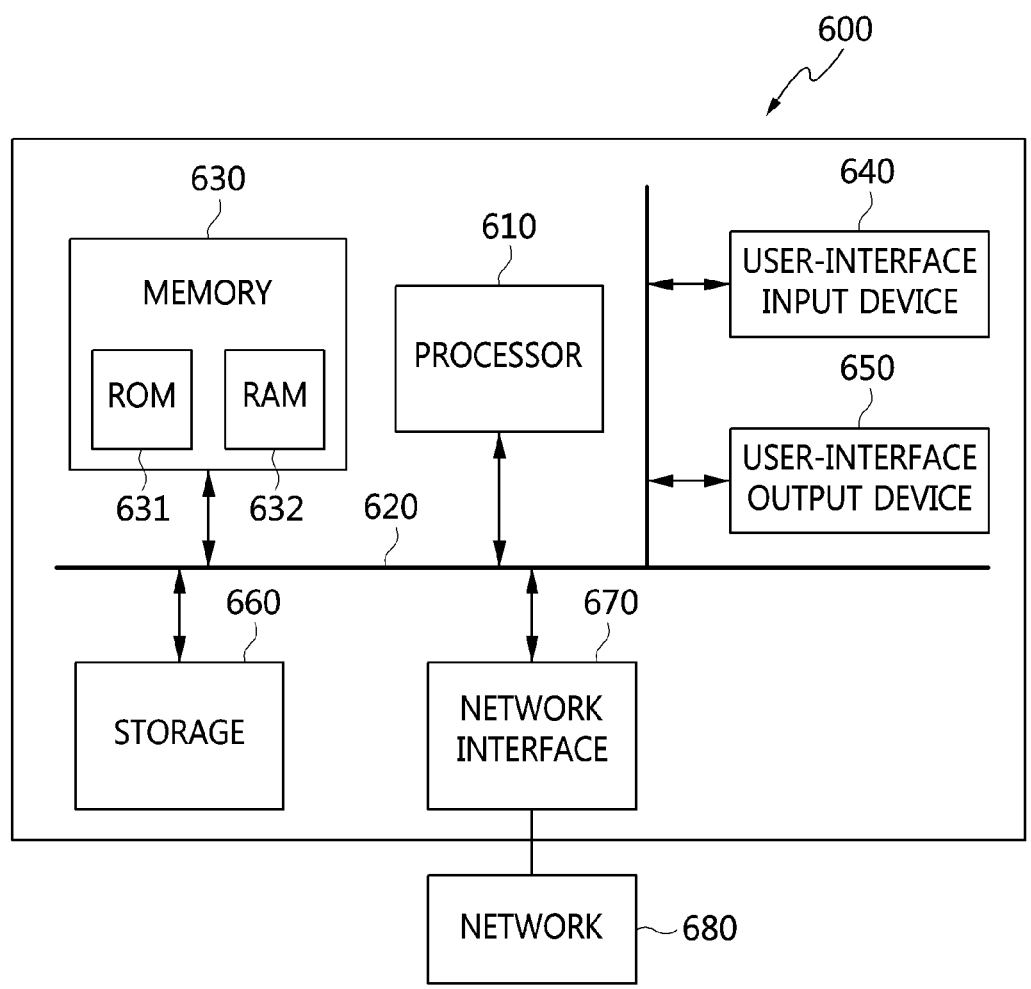
FIG. 6 is a view illustrating a computer system according to an embodiment of the present invention.

FIG. 6 is a view illustrating a computer system according to an embodiment of the present invention.

Referring to FIG. 6, an embodiment of the present invention may be implemented in a computer system including a computer-readable recording medium. As illustrated in FIG. 6, the computer system 600 may include one or more processors 610, memory 630, a user-interface input device 640, a user-interface output device 650, and storage 660, which communicate with each other via a bus 620. Also, the computer system 600 may further include a network interface 670 connected to a network 680. The processor 610 may be a central processing unit or a semiconductor device for executing processing instructions stored in the memory 630 or the storage 660. The memory 630 and the storage 660 may be various types of volatile or nonvolatile storage media. For example, the memory may include ROM 631 or RAM 632.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, the channel-code-decoding performance of an OFDM communication signal receiver for a high-speed mobile environment may be improved.

Also, the present invention may enable reception of a broadcast in a vehicle that is moving at high speed, which is impossible in the conventional broadcast reception system.

Also, the present invention may correct an estimate of a Signal-to-Noise Ratio (SNR) in an OFDM-based reception system.

As described above, the method for channel decoding using noise level correction in a high-speed mobile reception environment and the apparatus for the same according to the present invention are not limitedly applied to the configurations and operations of the above-described embodiments, but all or some of the embodiments may be selectively combined and configured, so that the embodiments may be modified in various ways.

What is claimed is:

1. A method for channel decoding using noise level correction, comprising:

estimating, by a signal receiver based on Orthogonal Frequency-Division Multiplexing (OFDM) that is moving at high speed, Inter-Carrier Interference (ICI) power for received signal power based on a movement speed of the signal receiver;

calculating, by the signal receiver, a Signal-to-Noise Ratio (SNR) for a received signal using an estimate of the ICI power; and decoding, by the signal receiver, a channel code based on a Log Likelihood Ratio (LLR) per bit, calculated based on the SNR, and the received signal, wherein the estimate of the ICI power is estimated based on a value acquired by multiplying a symbol length by a maximum Doppler shift frequency, which is calculated depending on the movement speed, and wherein the SNR is calculated in consideration of the symbol length so that the SNR gets to be larger as the symbol length becomes shorter.

2. The method of claim 1, wherein the SNR is calculated by dividing the received signal power by a sum of noise power and the estimate of the ICI power.

3. The method of claim 1, wherein the maximum Doppler shift frequency is calculated based on the movement speed, a center frequency of an OFDM signal, and a speed of light.

4. The method of claim 1, wherein the movement speed is measured through a separate speed measurement module that is capable of communicating with the signal receiver.

5. A signal receiver based on Orthogonal Frequency-Division Multiplexing (OFDM), comprising:

a processor for estimating Inter-Carrier Interference (ICI) power for received signal power based on a movement speed, calculating a Signal-to-Noise Ratio (SNR) for a received signal using an estimate of the ICI power, and decoding a channel code based on a Log Likelihood Ratio (LLR) per bit, calculated based on the SNR, and the received signal; and memory for storing the received signal, wherein the estimate of the ICI power is estimated based on a value acquired by multiplying a symbol length by a maximum Doppler shift frequency calculated depending on the movement speed, and wherein the SNR is calculated in consideration of the symbol length so that the SNR gets to be larger as the symbol length becomes shorter.

6. The signal receiver of claim 5, wherein the SNR is calculated by dividing the received signal power by a sum of noise power and the estimate of the ICI power.

7. The signal receiver of claim 5, wherein the maximum Doppler shift frequency is calculated based on the movement speed, a center frequency of an OFDM signal, and a speed of light.

8. The signal receiver of claim 5, wherein the movement speed is measured through a separate speed measurement module that is capable of communicating with the signal receiver.

* * * * *